H. T. DUNBAR.

TIRE FASTENER FOR WHEELS.

APPLICATION FILED NOV. 27, 1914.

1,180,381. Patented Apr. 25, 1916.

WITNESSES
Julius J. Pribl
W. Roy Taylor

INVENTOR
Harris T. Dunbar
by Geyer & Popp
ATTORNEYS.

THE COLUMBIA PLANOGRAPH CO., WASHINGTON, D. C.

UNITED STATES PATENT OFFICE.

HARRIS T. DUNBAR, OF BUFFALO, NEW YORK.

TIRE-FASTENER FOR WHEELS.

1,180,381. Specification of Letters Patent. Patented Apr. 25, 1916.

Application filed November 27, 1914. Serial No. 874,174.

*To all whom it may concern:*

Be it known that I, HARRIS T. DUNBAR, a citizen of the United States, residing at Buffalo, in the county of Erie and State of New York, have invented new and useful Improvements in Tire-Fasteners for Wheels, of which the following is a specification.

The object of this invention is to provide a sectional tire having improved means for efficiently and easily fastening the sections of the tire to the rim of a wheel.

Figures 1, 2, 3, 4, 5, 6:
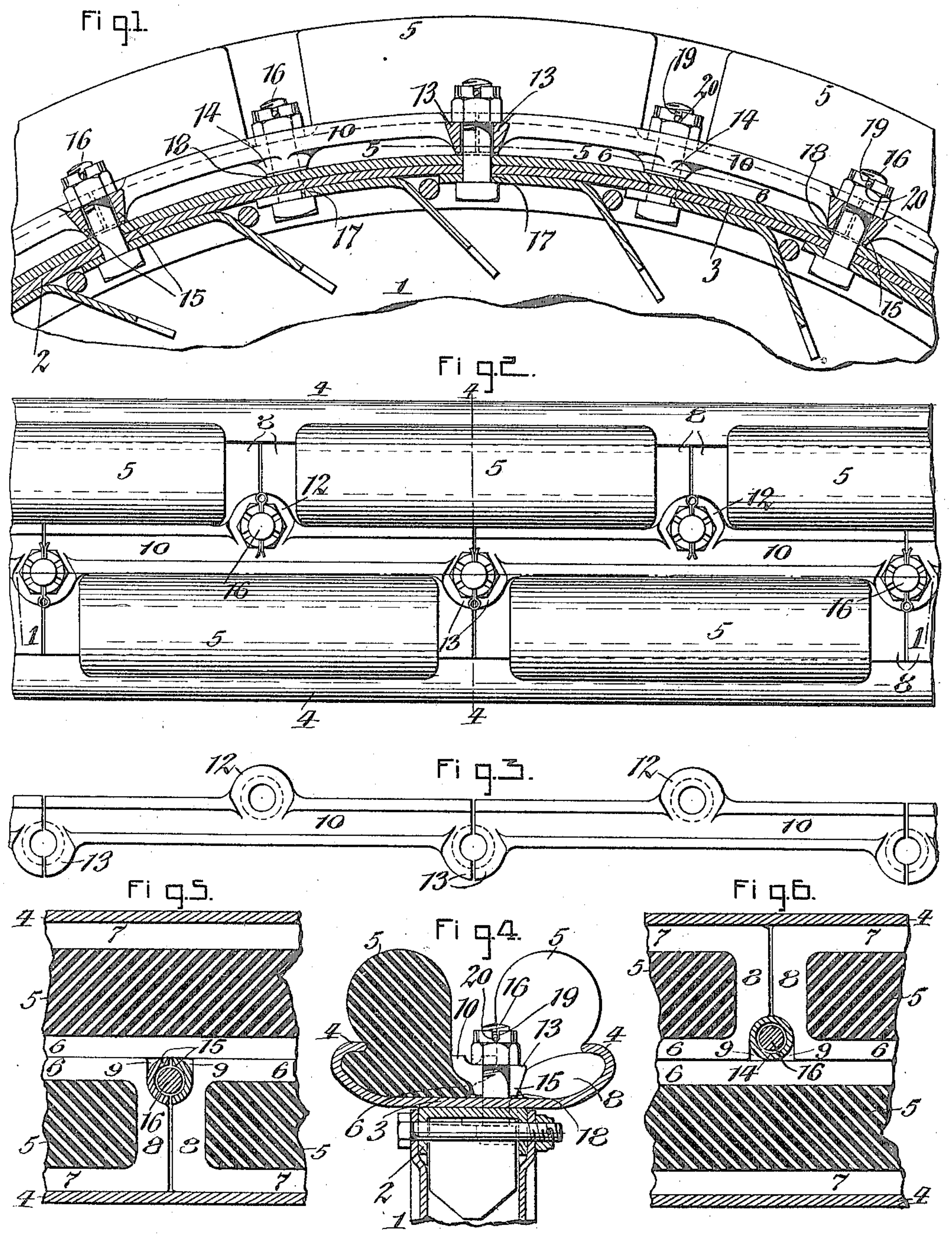
Figure 7:
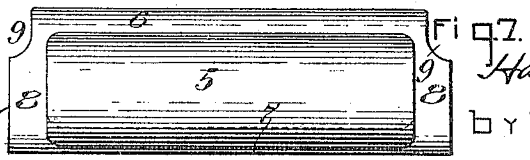

In the accompanying drawings: Figure 1 is a fragmentary vertical longitudinal section of a wheel having its rim provided with the sectional tire and fastening, embodying my improvements, the section being taken in line 1—1, Fig. 2. Fig. 2 is a top plan view thereof. Fig. 3 is a top plan view of several of the clamping members forming part of the means for fastening the tire sections to the rim of the wheel. Fig. 4 is a vertical transverse section taken in line 4—4, Fig. 2. Figs. 5 and 6 are fragmentary longitudinal sections taken in the correspondingly numbered lines in Fig 1. Fig. 7 is a detached top plan view of one of the tire sections.

Similar characters of reference indicate corresponding parts throughout the several views.

1 represents the body of the wheel which may be of any suitable construction but which as shown in the drawings is provided with a felly 2. Upon the periphery of this felly is mounted the rim of the wheel which in its preferred form comprises an annular band 3 engaging its inner side with the felly and two inwardly projecting clencher or hook flanges 4 arranged at opposite longitudinal edges of the band. Within this rim are arranged a plurality of rows of elastic tire sections or blocks, two of such rows being preferably employed side by side and the joints between the sections in one row being arranged transversely out of line or alternating with the joints between the sections of the other row so that the several joints of the two rows of tire sections are staggered. Each of the tire sections is preferably constructed of rubber or other elastic material and comprises an outer reduced body portion 5 and an inner wide base portion which is seated on the outer side of the rim band and provided with an inner longitudinal flange 6, an outer longitudinal flange 7 and two transverse flanges 8, 8 arranged at opposite ends of the tire section. The outer longitudinal flange of each tire section engages underneath the clencher flange on the respective side of the rim, its inner longitudinal flange engages with the inner longitudinal flanges of two tire sections in the other row, and the transverse flanges at opposite ends of each tire section engage with the opposing transverse flanges of adjacent tire sections in the same row. Each of the tire sections has the inner corners at the junction of its inner longitudinal and transverse flanges removed and constructed to form recesses or notches 9, so that when two adjacent tire sections in the same row are placed end to end a gap or clearing space is formed between the same which leads from the exterior of the tire section to the outer face of the rim band. The means for securing these tire sections to the rim may be variously constructed but as shown in the drawings these means are so designed that they also serve to secure the rim to the felly of the wheel. These means have been found suitable in practice and as shown in the drawings the same are constructed as follows: Arranged in an annular row between the two rows of tire sections are a plurality of clamping members each of which preferably comprises a longitudinal part or bar 10 which engages with the entire outer side of the inner longitudinal flange of one of the tire sections and also partly with the longitudinal inner flanges of two tire sections in the other row. Between its opposite ends this clamping bar is provided on one side with a laterally or outwardly projecting transverse part 12 which is preferably constructed in the form of a perforated lug or eye and is adapted to bear against the upper side of the opposing transverse flanges of two adjacent tire sections of one row, while the opposite ends of this bar are provided with two transverse parts 13, 13 which project laterally in a direction opposite to the eye 12 and are preferably constructed in the form of half eyes which engage with the transverse flanges at opposite ends of one of the tire sections in the other row.

Each of the complete eyes 12 of a clamping member is provided on its underside with an inwardly projecting tubular boss or collar 14 which is arranged in the gap or clearance space formed by the recesses 9 in the transverse flanges of two tire sections and bears against the bottom or surface of the rim band immediately below the same. Each of the partial eyes 13 at opposite ends of the clamping member is provided with an inwardly projecting semi-tubular boss or collar 15 which, together with the corresponding half eye on the adjacent clamping member forms a complete eye and these two half eyes together are arranged within the gap formed by the recesses in the opposing transverse flanges of two adjacent tire sections and engage with the surface of the rim band.

The clamping members, rim and felly are secured together for holding the tire sections in place by a plurality of clamping bolts 16 which are arranged in staggered relation to each other circumferentially of the wheel. In the preferred construction one of these bolts passes through the complete eye of each clamping member and the boss thereof and through corresponding openings in the rim and felly and the head of this bolt bears against the underside of the felly by means of an interposed plate 17 while the nut of the same bears against the upper side of the complete eye. In like manner one of these bolts passes through the opening formed between the two half eyes and two half bosses of two adjacent clamping members and through coinciding openings formed in the rim band and the felly and bears with its head against the underside of the felly through the medium of an interposed plate 17 while the nut of this bolt bears against the outer sides of both half eyes. Washers 18 of felt or similar fibrous or elastic material are preferably interposed between the inner sides of the bosses on the clamping members and the outer surfaces of the rim band. In order to prevent the nuts from becoming detached while the wheel is in use, each of these nuts is provided in its outer end with transverse notches 19 which receive a transverse cotter pin 20 on the outer end of the respective clamping bolt. This manner of connecting the tire sections to the wheel rim permits of easily and quickly detaching any one or more of these sections if they should become worn and substituting new sections therefor, and when all the parts are secured in place the tire sections are incapable of becoming detached under the most severe usage to which they are liable to be subjected.

I claim as my invention:

1. The combination of a rim having an annular band and inwardly projecting clencher flanges at opposite edges of the band, a tire comprising a plurality of rows of sections or blocks each section resting on the band of said rim and provided with an outer longitudinal flange engaging under the adjacent clencher flange, an inner longitudinal flange engaging the inner longitudinal flange of a tire section in the other row, and transverse flanges at opposite ends of the tire section and engaging with the corresponding ends of the tire sections in the same row, and means for holding the tire sections in place comprising a plurality of clamping members each of which has a longitudinal part engaging with the inner longitudinal flanges of the tire sections, and transverse parts projecting laterally from opposite sides of said longitudinal part and engaging with transverse flanges of adjacent tire sections, and clamping bolts connecting the transverse parts of said clamping members with said rim and each bolt arranged between the opposing ends of two adjacent tire sections.

2. The combination of a rim having an annular band and inwardly projecting clencher flanges at opposite edges of the band, a tire comprising a plurality of rows of sections or blocks each section resting on the band of said rim and provided with an outer longitudinal flange engaging under the adjacent clencher flange, an inner longitudinal flange engaging the inner longitudinal flange of a tire section in the other row, and transverse flanges at opposite ends of the tire section and engaging with the corresponding ends of the tire sections in the same row, and means for holding the tire sections in place comprising a plurality of clamping members each of which has a longitudinal part engaging with the inner longitudinal flanges of the tire sections, and transverse parts projecting laterally from opposite sides of said longitudinal part and engaging with transverse flanges of adjacent tire sections and said transverse parts being provided with inwardly projecting bosses which engage with the band of the rim, and bolts connecting the transverse parts of said clamping members with said rim.

3. The combination of a rim having an annular band and inwardly projecting clencher flanges at opposite edges of said band, a plurality of rows of tire sections or blocks arranged on said rim, the joints between the sections of one row and those of the other row being staggered and each section having an outer longitudinal flange engaging the adjacent clencher flange, an inner longitudinal flange engaging the inner flanges of the adjacent tire sections in the other row, and the inner corners of the inner and transverse flanges of each tire section having recesses, and means for holding said tire sections on said rim comprising a plurality of clamping members each of which has a longitudinal bar engaging with the upper side of the entire inner flange of one tire section in one row